United States Patent [19]

Shibagaki et al.

[11] Patent Number: 4,899,339
[45] Date of Patent: Feb. 6, 1990

[54] DIGITAL MULTIPLEXER

[75] Inventors: Taro Shibagaki, Tokyo; Takehiko Atsumi, Ichikawa; Hiroyuki Ibe, Yokohama; Sadao Tanikoshi, Tokyo, all of Japan

[73] Assignee: Kabushiki Kaisha Toshiba, Kawasaki, Japan

[21] Appl. No.: 254,847

[22] Filed: Oct. 7, 1988

[30] Foreign Application Priority Data

| Oct. 9, 1987 | [JP] | Japan | 62-254996 |
| Oct. 9, 1987 | [JP] | Japan | 62-254997 |
| Oct. 9, 1987 | [JP] | Japan | 62-254998 |
| Oct. 9, 1987 | [JP] | Japan | 62-254999 |
| Oct. 9, 1987 | [JP] | Japan | 62-255000 |

[51] Int. Cl.$^4$ ............................................. H04J 3/06
[52] U.S. Cl. ................................. 370/102; 370/112; 307/242
[58] Field of Search ................ 370/58, 112, 180, 102; 381/33, 49; 307/242, 243; 328/104, 105

[56] References Cited

U.S. PATENT DOCUMENTS

| 4,157,458 | 6/1979 | Roche | 370/112 |
| 4,658,397 | 4/1987 | Kawamura et al. | 370/58 |
| 4,744,082 | 5/1988 | Fujimura et al. | 370/112 |

Primary Examiner—Joseph A. Orsino
Assistant Examiner—Frank M. Scutch, III
Attorney, Agent, or Firm—Oblon, Spivak, McClelland, Maier & Neustadt

[57] ABSTRACT

N framing units block N-channel input digital signals, respectively, to provide blocked signals. The framing units respond to a common block synchronization signal from a multiplexing unit to provide the blocked signals in a time relation suitable for multiplexing. The multiplexing unit multiplexes the blocked signals from the framing units to provide a multiplexed signal (higher-order group signal).

18 Claims, 10 Drawing Sheets

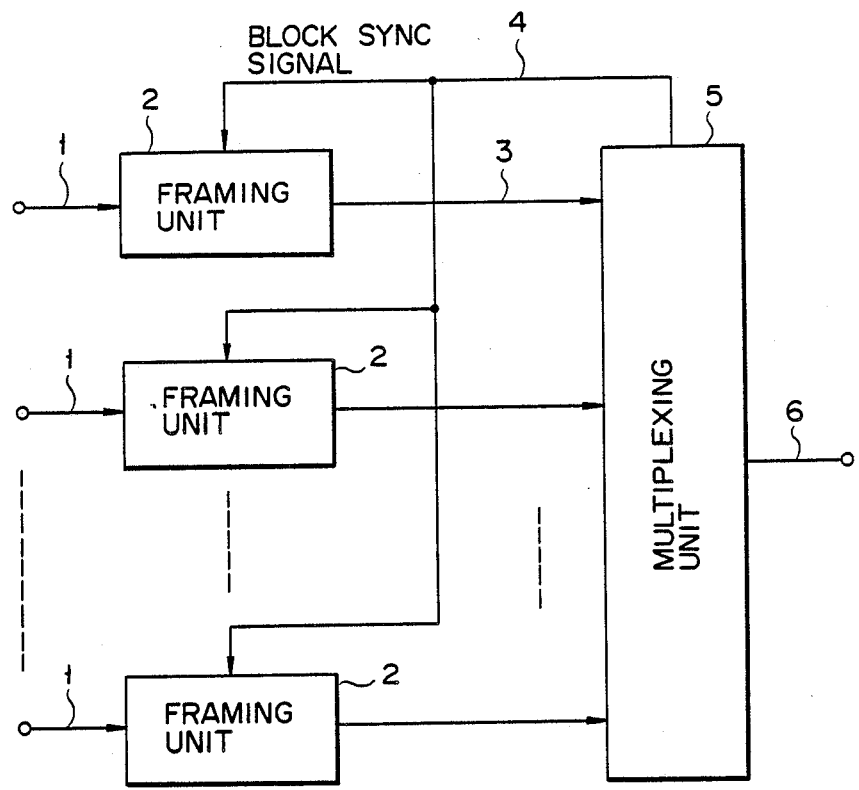
F I G. 1

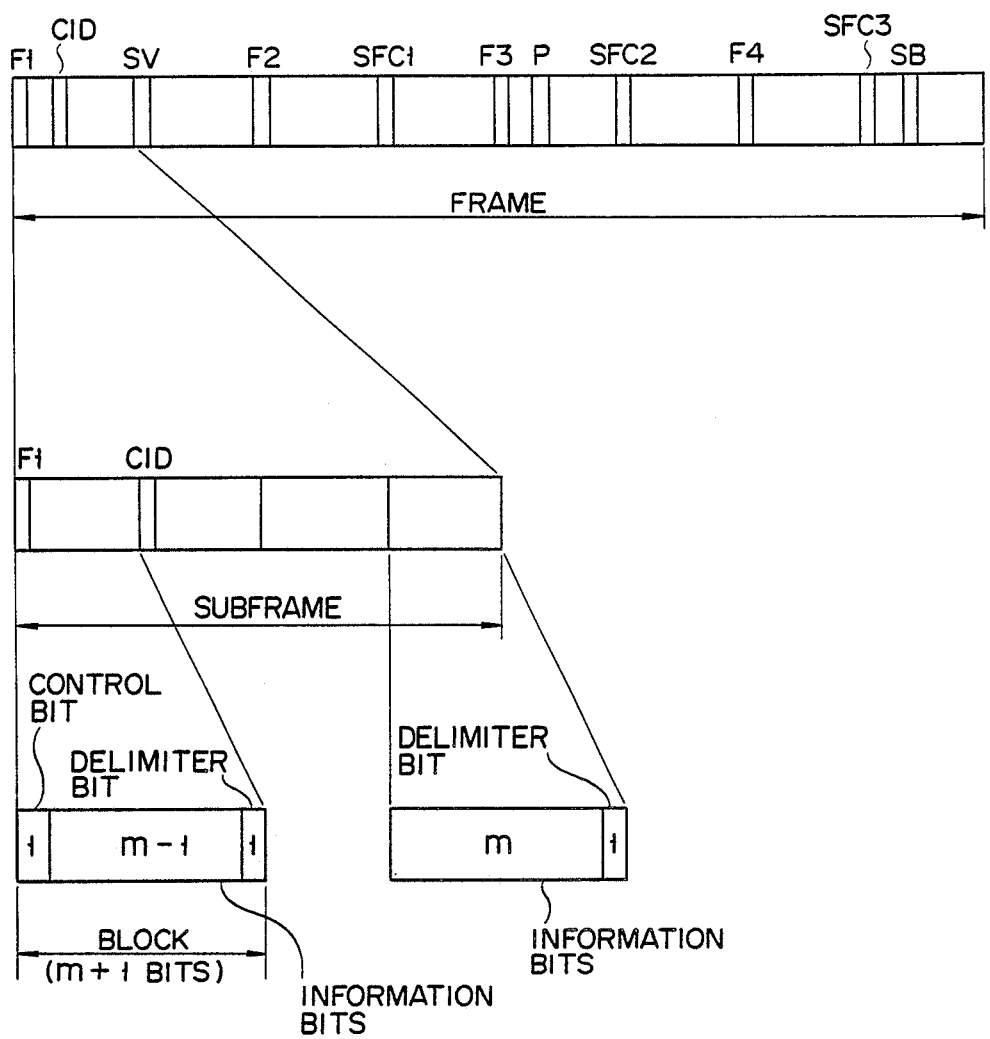
F I G. 3

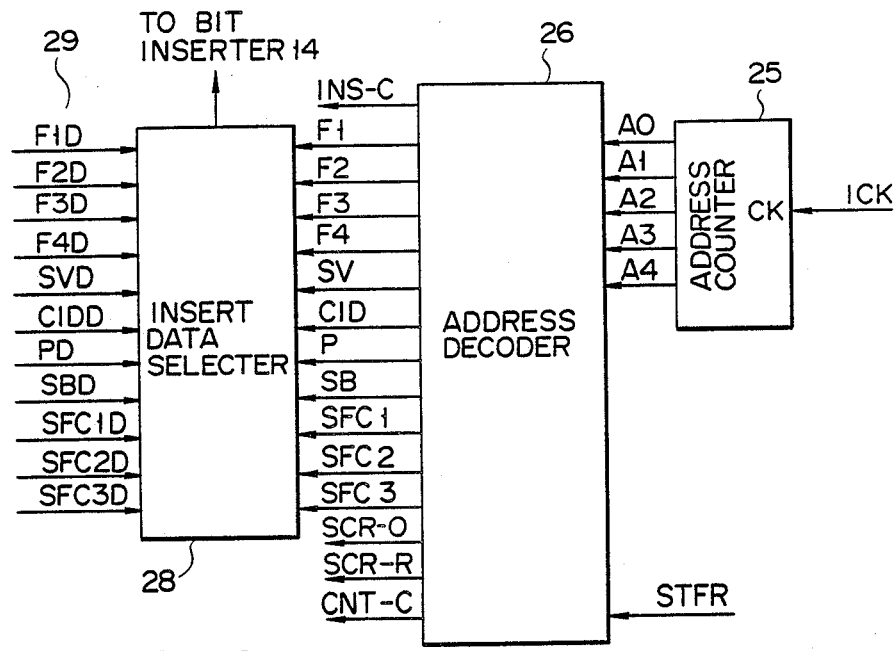
F I G. 8
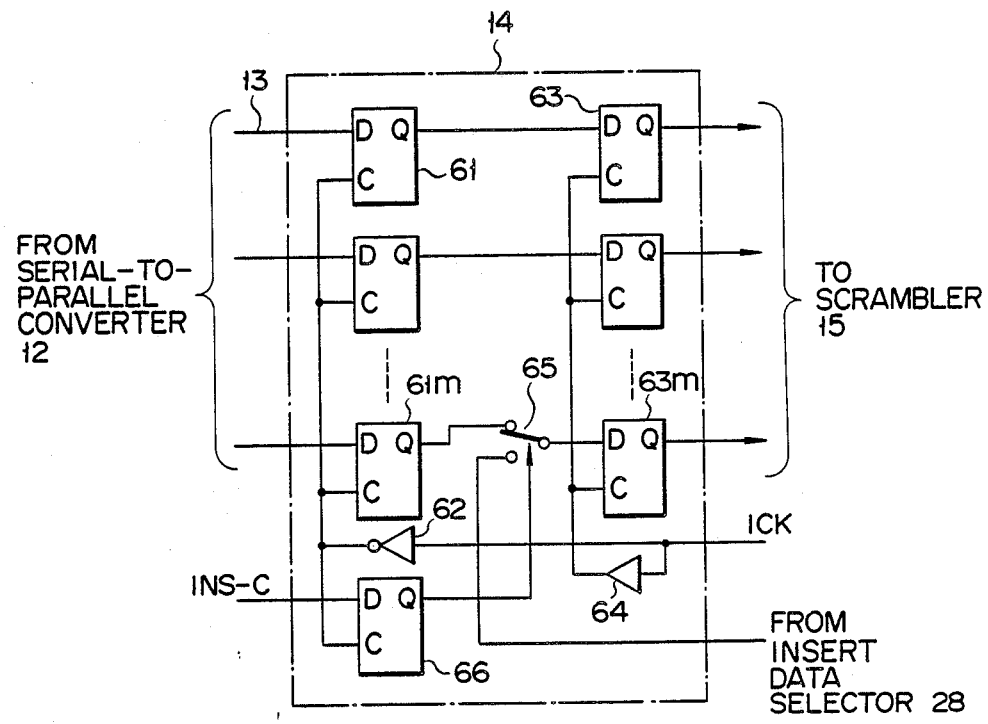
F I G. 9

DIGITAL MULTIPLEXER

BACKGROUND OF THE INVENTION

1. Field of the Invention

The present invention relates to a digital multiplexer for time-division multiplexing digital signals from framing units.

2. Description of the Related Art

A digital multiplexer is a device for converting lower-order group input signals, which are asynchronous digital signals, on a plurality of channels to a higher-order group signal by time-division multiplexing. A conventional digital multiplexer is described in "Multiplexing and Synchronization Techniques," ch. 3 in a book entitled "Digital Communication Techniques," Tokai University publishing society in Japan. According to this digital multiplexer, a plurality of framing units are provided for a plurality of channels, respectively, and output signals of the framing units are time-division multiplexed by a multiplexer. In this case, the multiplexer provides to the framing units block synchronization signals each of which is delayed in time by a predetermined number of bits which differs from channel to channel. Each of the framing units produces a block signal composed of a m-bit information signal and a 1-bit block delimiter signal in synchronism with a corresponding block synchronization signal. The multiplexer multiplexes block signals sequentially sent from the framing units and adds C bits to a resultant multiplexed signal. This results in a BSI-code higher-order group signal composed of mBIC.

According to the multiplexing scheme as described above, to produce the block synchronization signals which are subjected to delays suitable for the respective channels, the multiplexer needs delay circuits corresponding in number to the channels. This will result in increased scale and cost of the multiplexer circuitry.

In addition, to design a digital multiplexer with a different number of multiplexing (the number of channels for lower-order group signals), delay circuits necessary for producing block synchronization signals must be provided in the number of signals to be multiplexed. This will render flexible alteration of the number of signals to be multiplexed difficult.

SUMMARY OF THE INVENTION

It is accordingly an object of the present invention to provide a digital multiplexer which formats lower-order group signals in a form suitable for subsequent multiplexing in each of framing units, and multiplexes lower-order group signals to a higher-order group signal by simply multiplexing the lower-order group signals produced by the framing units.

According to the present invention, N framing units block N-channel digital information signals, respectively, to provide blocked signals. In this case, the framing units respond to a common block synchronization signal from a multiplexing unit to provide the blocked signals in a time relation suitable for multiplexing. The multiplexing unit multiplexes the blocked signals from the framing units to provide a multiplexed signal (higher-order group signal).

BRIEF DESCRIPTION OF THE DRAWINGS

FIG. 1 is a block diagram of a digital multiplexer embodying the present invention;

FIG. 3 is a format of a higher-order group signal produced by the multiplexing unit of FIG. 1;

FIG. 8 is a block diagram of the principal portions of the framing unit;

FIG. 9 is a block diagram of the bit inserter of FIG. 2;

DETAILED DESCRIPTION OF THE PREFERRED EMBODIMENTS

Figure 2:
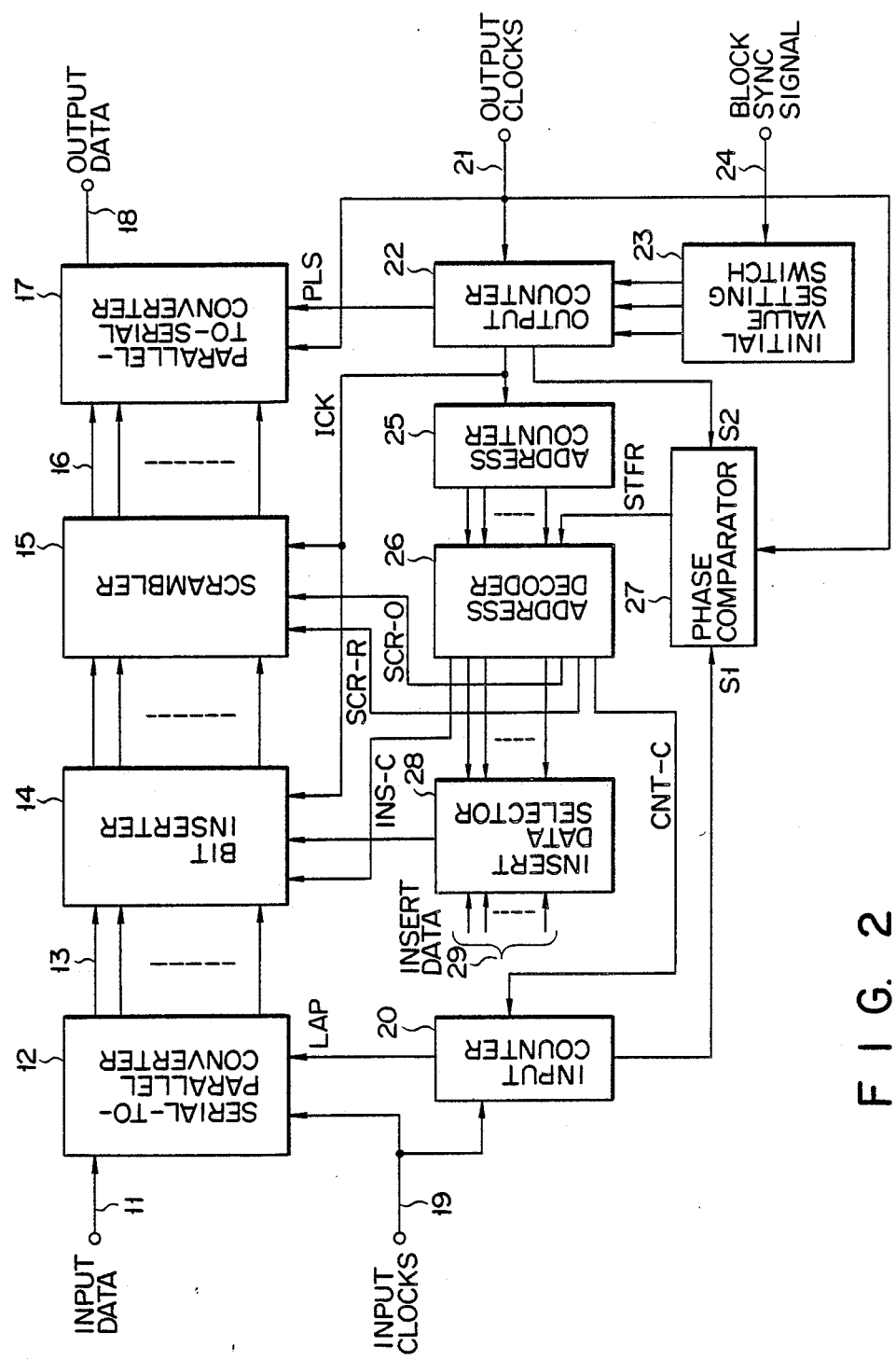
FIG. 2 is a block diagram of the framing units of FIG. 1.

Referring now to FIG. 1, a digital multiplexer of the present invention comprises N framing units connected to receive lower-order group signals 1 on N channels, respectively, and having their outputs coupled to a multiplexing unit 5. A lower-order group input signal is converted by a corresponding framing unit to a blocked signal 3 composed of m-bit information and a 1-bit block delimiter signal inserted at (m+1)-bit intervals. Blocked signals from framing units 1 are then time-division multiplexed by multiplexing unit 5 for conversion to a higher-order group signal of a BSI (Bit Sequence Independence) code 6 of mBl, for example. For example, assuming that the bit rate of the lower-order group input signal is 100 Mbits per second, and the number of channels is N=16, the bit rate of the higher-order group output signal will be 1.6 Gbits per second.

As shown in FIG. 3, mBl is a coded signal composed of a m-bit information signal (m−1 bits in the case of a block containing a control bit) and a C (Complementary) bit serving as the block delimiter bit having a cycle of m+1 bits. This is a sort of BSI code. The C bit is represented by a complement of an information bit k bits before. Namely, if the information bit preceding the C bit by k bits is 1, then the C bit will be 0. Conversely, if the information bit is 0, then the C-bit will be 1. By defining the C bit as above, the higher-order group signal 6 resulting from the multiplexing process will never contain consecutive 1s or 0s more than m bits and thus has a proper format for the BSI code.

As the C bit acting as the block delimiter signal for each channel, contained in the higher-order group signal, a complement of the information bit of the previous channel may be used. The block delimiter signal for each channel of the higher-order group signals may be replaced by a complement of an information bit k bits before.

Moreover, a space bit or a mark bit may be used as the block delimiter signal.

The insertion of the block delimiter signal, or the C bit into a blocked signal may be performed by either of framing unit 2 and multiplexing unit 5.

Framing units 2 are arranged to receive a common block synchronization signal 4 from multiplexing unit 5, delay the respective data by the respective necessary bits and deliver blocked signals 3 simultaneously.

Because N framing units 2 deliver the blocked signals simultaneously, N bits are simultaneously applied to N inputs of multiplexing unit 5. Multiplexing unit 5 converts the N-bit parallel signal to a serial signal, thereby producing a time-division multiplexed higher-order group signal.

FIG. 2 shows a detailed arrangement of framing units of FIG. 1. A serial-to-parallel converter 12 has an input terminal and m data output terminals. Input data 11 applied to the input data terminal in serial form constitutes a digital information signal which corresponds to the lower-order group signal of FIG. 1. Serial-to-parallel converter 12 converts input data 11 to parallel data 13 of m bits or m−n bits. Here m>n>0. In this embodiment, the description is made of the case where n=1. When serial-to-parallel converter 12 produces parallel data of m−n bits, m−n bits (m−1 bits in this embodiment) are output onto the first to (m−n)−th or (m−1)−th output lines in the embodiment.

The outputs of serial-to-parallel converter 12 are connected to a bit inserter via output lines. Serial-to-parallel converter 12 applies the parallel data to bit inserter 14 via the output lines. When parallel data 13 includes m−1 bits, bit inserter 14 provides to a remaining output line of converter 12 control bits including, as shown in FIG. 3, frame synchronization bits (F1-F4) necessary for framing, a channel-identifying bit (CID), a parity bit (P), a service bit (SV), staff control bits (SFC1-SCF3), a staff bit (SB) and the like.

Frame synchronization bits F1 to F4 are used for specifying the position of a corresponding frame at the receiving end, in other words, for establishing frame synchronization. Channel identification bit CID is used for identifying a corresponding channel to which the relevant frame belongs. Parity bit P is used for parity check at the receiving end. Service bit SV is at user's disposal. Parity bit P may be inserted into the parallel data after the multiplexing process to higher-order group signal 6.

Staff bit SB is provided for synchronization of the input and output of framing unit 2 and inserted into a specific position when a phase difference above a fixed value occurs between input and output clocks. Staff control bits SFC1 to SFC3 are adapted to represent whether data at a position into which the staff bit is to be inserted is staff bit SB or usual data. The insertion of staff bit SB into the parallel data is called "staff on."

Outputs of bit inserter 14 are connected to a scrambler 15. Scrambler 15 scrambles an output signal of bit inserter 14 so as to keep the mark-to-space ratio of the output signal almost constant and then provides a parallel frame signal 16. In this embodiment, bit inserter 14 and scrambler 15 constitute the framing unit.

Outputs of the framing unit, or outputs of scrambler 15 are connected to inputs of a parallel-to-serial converter 17. Parallel-to-serial converter 17 converts the parallel frame signal 16 from the framing unit to a serial data signal which in turn is output as a block signal 18.

Input clocks (a first clock signal) 19 are applied to serial-to-parallel converter 12 and an input counter (a first counter) 20 through a clock input terminal. The input clocks 19 are synchronized with input data 11. Input counter 20 serves as means for switching the parallel data 13 output from serial-to-parallel converter 12 between m bits and (m−n) bits and is composed of a modulus counter of dividing-factor variable type. Input counter 20 usually operates as a modulo m counter to apply a latch pulse LAP to serial-to-parallel counter 12 when counting the input clocks 19 by m, i.e., the number of bits contained in the parallel data 13.

On the other hand, output clocks (a second clock signal) 21 are applied to parallel-to-serial converter 17, an output counter 22 and a phase comparator 27 through an output clock terminal. The output clocks are synchronized with the output data 18. Output counter 22 is a modulo (m+1) counter which is adapted to produce internal clocks (a third clock signal ICK used in bit inserter 14 and scrambler 15 and apply a parallel load signal PLS to parallel-to-serial converter 17 when the count thereof becomes 0. The parallel load signal PLS is used as a timing signal for outputting the block signal 18 from parallel-to-serial converter 17.

Output counter 22 is connected to an initial-value setting switching circuit 23. Supplied with a block synchronization signal 24 corresponding to the block synchronization signal 4 produced by multiplexing unit 5 of FIG. 1, initial-value setting circuit 23 loads an initial value previously set therein to output counter 22. Output counter 22 is preset by the initial value and issues to serial-to-parallel converter 17 the parallel load signal PLS corresponding to the initial value. Accordingly, the phase of the parallel load signal PLS, acting as the timing signal for outputting the block signal 18, can arbitrarily be set to the block synchronization signal 24 by selection of the initial value. Thus, it becomes possible to control the output timing of the block signal 18, or the phase of the block signal relative to the block synchronization signal 24. As a result, even if being supplied with the common block synchronization signal 4, framing units 2 of FIG. 1 can simultaneously issue the block signals 3 so that they may correctly be multiplexed in multiplexing unit 5, by properly setting initial-value setting switch 23.

As described above, the internal clocks ICK produced by output counter 22 are applied to bit inserter 14, scrambler 15 and address counter 25. Outputs of address counter 25 are coupled to inputs of phase comparator 27 along with an output of phase comparator 27.

Phase comparator 27 makes a comparison between a phase-comparing signal S1 issued from input counter 20 and a phase reference signal S2 issued from output counter 22. Phase reference signal S2 has only to be synchronized with the output clocks 21. Thus, for example, even a start pulse in one frame may be used as the phase synchronization signal. Phase comparator 27, having a storage function, stores the result of the phase comparison between signals S1 and S2 at a specific time within one frame. When detecting phase inconsistency of signals S1 and S2 and storing its comparison result, phase comparator 27 issues a staff demand signal SFTR to address decoder 26.

It is preferable that a time when phase comparator 27 stores the comparison result is a time earlier than the first bit SFC1 of staff control bits SFC1 to SFC3 (FIG. 3), for example, a time corresponding to the front position of a frame. This is because, when address decoder 26 receives the staff demand signal SFTR from phase comparator 27, each of the staff control bits SFC1 to SFC3 is set to a specific value, and whether or not the staff bit SB is to be inserted into the block signal is instructed by a combination of the three bits.

When phase comparator 27 is timed to store the comparison result as described above, the setting of the staff bits SFC1 to SFC3 and the insertion of the staff bit SB into the block signal on the basis of the stored comparison result may be performed in the same frame as the frame in which the comparison result is recorded.

Phase comparator 27 may store the comparison result later than the first staff control bit SFC1. Not only is the comparison result stored once per one frame, but also it may be stored several times per one frame in synchronism with the cycle of blocks forming one frame. In this case, setting of the staff control bits SFC1 to SFC3 and insertion of the staff bit SB may be performed in the next frame. The storage of the comparison result in phase comparator 27 is cancelled within a period of time between the insertion of the staff bit SB based on the storage and the completion of framing the relevant frame.

Address decoder 26 responds to the outputs of address counter 25 and the output of phase comparator 27 to apply a select signal to an insert data selector 28, an insert control signal INS-C to bit inserter 14, a scramble off signal SCR-0 and a scramble reset signal SCR-R to scrambler 15, and a counter mode switching signal CNT-C to input counter 20.

The counter mode switching signal CNT-C is adapted to switch input counter 20 from the modulo m counter to the modulo (m−1) counter when bit inserter 14 inserts data to be inserted (control signal) from insert data selector 28 in the parallel data 13. In response to the counter mode switching signal CNT-C, input counter 20 issues the latch pulse LAP to serial-to-parallel converter 12 after counting (m−1) input clocks 19. At this time, serial-to-parallel converter 12 issues parallel data of input data 11 onto only (m−1) output lines among m output lines and no data onto another output line. The output line with no data can be used as an empty bit for bit inserter 14. Thus, bit inserter 14 can apply a control bit to the empty-bit output line. The output line used as the empty bit is preselected to be the lowermost one (the m-th output line) of the output lines of serial-to-parallel converter 12. Bit inserter 14 inserts in this empty bit a control bit necessary for framing supplied from insert data selector 28.

In FIG. 2, address counter 25, address decoder 26 and insert data selector 28 constitute a frame controller.

Figure 4:
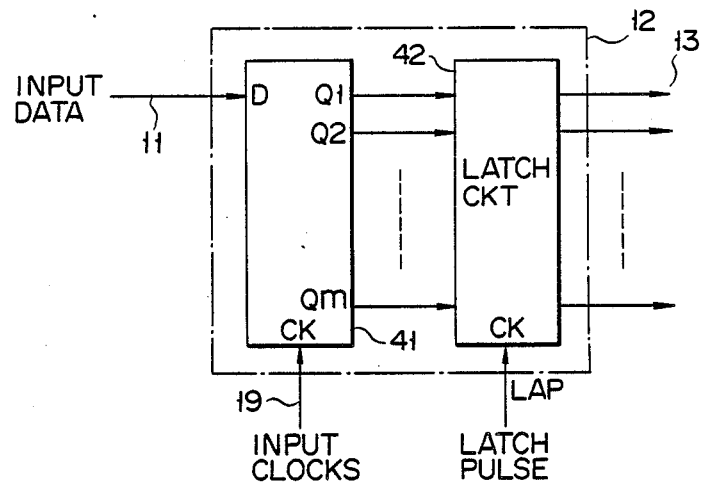
FIG. 4 is a block diagram of the serial-to-parallel converter of FIG. 2.

Next, arrangements of various components of FIG. 2 will be described by reference to FIGS. 4 through 10. FIG. 4 shows an arrangement of serial-to-parallel converter 12, which is comprised of an m-stage shift register 41 and a latch circuit 42. M-stage shift register 41 receives input data (lower-order group signal) 11 and input clocks 19, and latch circuit 42 responds to latch pulse LAP to temporally store parallel outputs of shift register 41 and issue parallel data 13.

Figure 5:
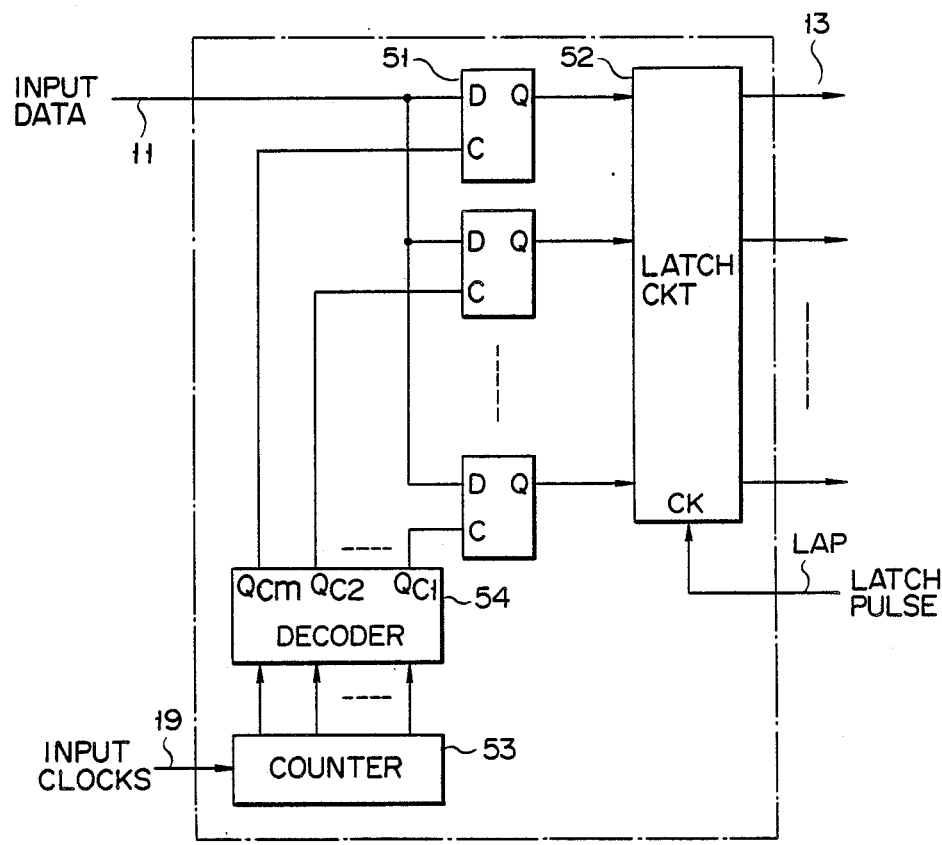
FIG. 5 shows an alternative to the serial-to-parallel converter.
Figure 6:
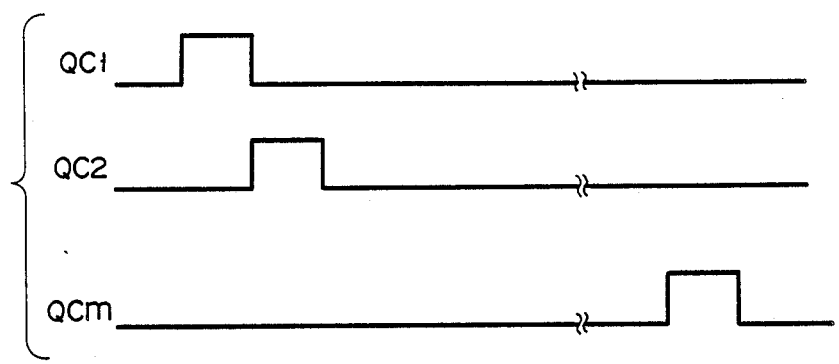
FIG. 6 is a timing chart for explaining the operation of the serial-to-parallel converter of FIG. 5.

FIG. 5 shows another arrangement of serial-to-parallel converter 12, which is comprised of m edge-triggered type-D flip-flops 51, a latch circuit 52 responsive to latch pulse LAP to temporally store outputs of flip-flops 51, a counter 53 adapted to count input clocks 19, and a decoder 54 for decoding an count of counter 53. FIG. 6 shows waveforms of outputs Qcl through Qcm of decoder 54 which are applied to clock inputs of flip-flops 51 as clock pulses. By being sequentially clocked, flip-flops 51 can operate like shift register 41 of FIG. 4.

Figure 7:
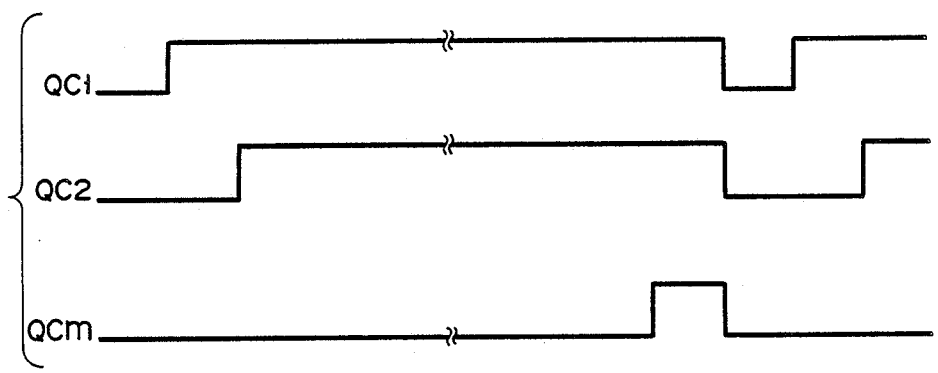
FIG. 7 is a timing chart for explaining another operation of the serial-to-parallel converter.

A master-slave type-D flip-flop may be used as each of flip-flops 51 of FIG. 5. In this case, the clock pulses provided by decoder 54 are such that their rising edges are sequentially delayed and their falling edges occur simultaneously as shown in FIG. 7. Master flip-flops respond to the rising edges of the clock pulses to perform serial-to-parallel conversion of input data 11. On the other hand, slave flip-flops latch the parallel data from the master flip-flops in response to the falling edges of the clocks. In this case, flip-flops (master-slave flip-flops) 51 double as latch circuits, eliminating the need for latch circuit 52.

FIG. 8 specifically shows the output signals of address decoder 26 responsive to output signals of address counter 25 and the insert data 29 applied to insert data selector 28. F1~F4, SV, CID, P, SFC1~SFC3 applied to insert data selector 28 from address decoder 26 instruct selection of corresponding control signals denoted by the same symbols in FIG. 3. F1D~F4D, SVD, CIDD, PD, SBD, SFC1D~SF3D contained in the insert data 29 each represent a value of data to be inserted in the parallel data 13 as a corresponding one of the control signals F1~F4, SV, CID, P, SFC1~SFC3. More specifically, frame synchronization bits F1D~F4D are chosen to be F1D=1, F2D=0, F3D=0, and F4D=1, for example. Staff control bits SFC1~SFC3 are chosen to be SFC1D=1, SFC2D=1, and SFC3D=1 at a time of the staff-on, namely, when the staff demand signal STFR is issued from phase comparator 27.

The insert control signal INS-C issued from address decoder 26 is used for instructing bit inserter 14 of the presence or absence of insert data. The scramble-off signal SCR-0 is used to instruct whether the m-th line data of parallel data applied to scrambler 15 should be scrambled or not (scramble-off). When a control signal is on the m-th line, the scramble-off state results. The scramble reset signal SCR-R is used to reset a random sequence generator (to be described later) in scrambler 15.

According to a block diagram of bit inserter 14 shown in FIG. 9, the parallel data 13 from serial-to-parallel converter 12 is applied to m edge-triggered type-D flip-flops 61, serving as buffers, which latch the parallel data in response to the rising edge of a clock obtained through an inverter 62 for inverting internal clocks ICK. Outputs of flip-flops 61 are latched by m edge-triggered type-D flip-flops 63 which respond to the rising edge of a clock obtained through a buffer 64 connected to receive internal clocks ICK.

A switch 65 is inserted between the Q output of the m-th flip-flop 61m and the D input of the m-th flip-flop 63m. This switch 65 is controlled by the Q output of an edge-triggered type-D flip-flop 66 which is responsive to the rising edge of an output clock of inverter 62 to latch the insert control signal INS-C. Switch 65 normally connects the Q output of flip-flop 61m with the D input of flip-flop 63m. When the insert control signal INS-C comes into the insert state, switch 65 disconnects flip-flop 61m from flip-flop 63m to apply insert data selected by insert data selector 28 to the D input of flip-flop 63m as a control signal. Consequently, the control signal is inserted into the previous empty bit.

Figure 10:
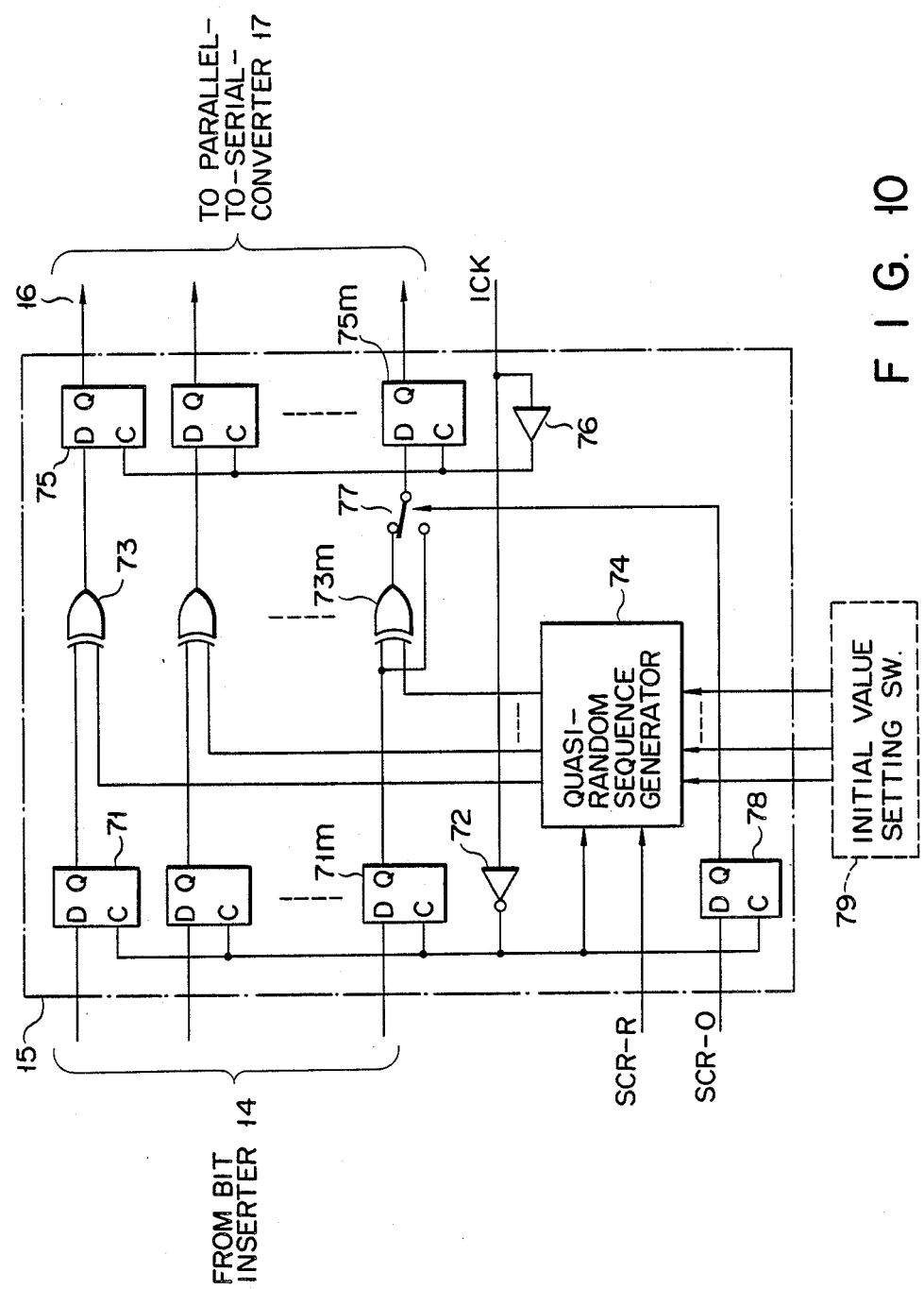
FIG. 10 is a block diagram of the scrambler circuit of FIG. 2.

Referring to FIG. 10, a block diagram of scrambler 15 is shown. The parallel data from bit inserter 14 is applied to m edge-triggered type-D flip-flops 71, serving as buffers, which latch the parallel data in response to the rising edge of a clock obtained through an inverter 72 for inverting internal clocks ICK. Outputs of flip-flops 71 are coupled to inputs of m exclusive OR circuits (EOR circuits) 73, respectively. EOR circuits 73 have their other inputs connected to outputs of quasirandom generator 74. The outputs of EOR circuits 73 are applied to m edge-triggered type-D flip-flops 75 which latch the EOR-circuit outputs in response to the rising edge of a clock obtained through a buffer 76 for inverting internal clocks ICK. Quasirandom generator 74 generates m M-sequence (maximum periodic sequence) signals. When the quasi-random sequential signal and input data are exclusively ORed, the input data is randomized, in other words, scrambled.

A switch 77 is inserted between the input/output of the m-th EOR circuit 73m and the D input of the m-th flip-flop 75m. This switch 77 is controlled by the Q output of an edge-triggered type-D flip-flop 78 which is responsive to the rising edge of an output clock of inverter 72 to latch the scramble-off signal SCR-0. Switch 65 normally connects the output of EOR 73m with the D input of flip-flop 75m. When the scramble-off signal SCR-0 comes into the scramble-off state, switch 65 connects the input of EOR circuit 73m (the output of flip-flop 71m) to the D input of flip-flop 75m. Because of this configuration of scrambler 15, the first through (m−1)-th bits of the parallel data from bit inserter 14 are normally scrambled, while the m-th bit is scrambled only when an information signal (input data) is on the m-th bit line. When an information signal is on the m-th bit line, the information signal is issued as it is without being scrambled.

Quasi-random generator 74 is formed of an array of shift registers and an exclusive OR circuit for feedback connection from proper stages of each shift register to the input thereof, generating a quasi-random pattern which is repeated in a long cycle. In this case, quasi-random generator 74 is reset by application of scramble reset signal SCR-R thereto so as to return the output thereof to an initial value and initiate the generation of the quasi-random sequence signals in a sequence determined by the feedback connection again. The initial value of quasi-random generator 74 can be set by initial value setting switch 79. If the initial value is made different from framing unit to framing unit of the digital multiplexer of FIG. 1, the randomization would not be degraded even after the multiplexing process by multiplexing unit 5.

As described above, according to the present invention, digital information signals on N channels are blocked by the N framing units, respectively, into blocked signals. In this case, each of the framing units respond to the common frame synchronization signal from the multiplexing unit to produce a train of blocked signals, the train of blocked signals of each framing unit is delayed from the train of blocked signals of the following framing unit by a time corresponding to a predetermined number of bits between successive blocked signals. Multiplexing unit 5 multiplexes the blocked signals from framing units 2 to produce a multiplexed signal (higher-order group signal). That is to say, framing units 2 perform the delay process necessary for multiplexing, and multiplexing unit 5 multiplexes the blocked signals simultaneously sent from framing units 2 to provide the higher-order group signal. Therefore, multiplexing unit 5 needs no delay circuits.

As described above, according to the present invention, each of framing units 2 performs both the insertion of control information necessary for framing and the staff process for synchronization. Therefore, the circuit scale of the multiplexer of the present invention can considerably be reduced as compared to a prior art which performs the framing process and the staff process separately. In addition, the framing process is performed at a stage in which the input data is converted to the parallel data of m bits or (m−1) bits by serial-to-parallel converter 12. Therefore, even if the bit rate of the lower-order group signal, or input data 11 is high, the processing speed for framing may be 1/m or 1/(m−1) Of the bit rate. This permits the use of general-purpose inexpensive electronic components in portions other than serial-to-parallel converter 12 and parallel-to-serial converter 17.

Further, the serial input data is converted by the serial-to-parallel converter to the parallel data of m bits or (m−n) bits (m>n>0) for the m output lines or (m−n) output lines, exclusive of n output lines in specific positions, and the control bits necessary for framing are put onto the n output lines (in the case of the parallel data of m−n bits) for insertion in the parallel data. Thereafter, the parallel data is converted to the serial data by the serial-to-parallel converter. With such a configuration, the processing speed in the framing unit becomes below 1/(m+1) of the output clock rate. Thus, many circuit portions other than the serial-to-parallel converter and parallel-to-serial converter can be realized by using usual ICs which are relatively slow in operation speed.

Moreover, the lowered processing speed is accompanied by reduced influence of propagation delay of the control signals on the framing unit. As a result, inside layouts of ICs will not be almost subjected to limitations for reducing the propagation delay.

Furthermore, there is no need of a write-read address control circuit including a distance control circuit for input and output management of a memory, which occupies a large proportion of hardware Instead, it is only required to add switching means, such as counters, for switching the number of bits of the parallel data from the serial-to-parallel converter between m bits and (m−n) bits in accordance with the presence or absence of insertion of control bits for framing. This will enable the whole circuit scale of the multiplexer to be reduced. Accordingly, in cooperation with a small proportion of circuits requiring high-speed operations, this will make IC version of the multiplexer easy.

Next, another embodiment will be described with reference to FIG. 11.

Figure 11:
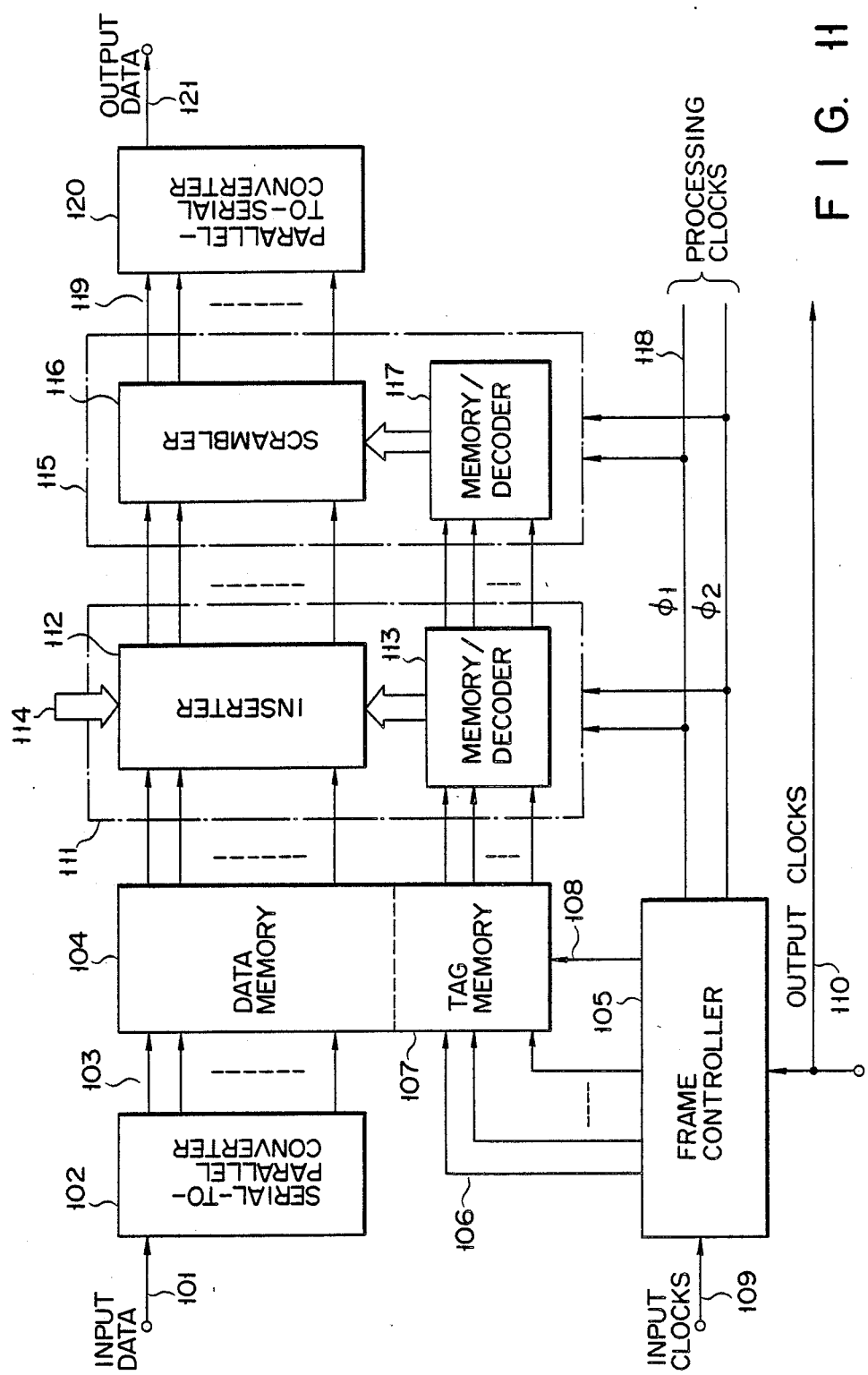
FIG. 11 is a block diagram of the framing unit used in a digital multiplexer according to another embodiment of the present invention.

In FIG. 11, an input terminal receiving serial input data 101 is connected to an input terminal of a serial-to-parallel converter 102, and a frame controller 105 is connected to a tag word memory 107. Serial-to-parallel converter 102 converts the serial input data 101 to parallel data 103 of m bits for application to data memory 104. Data memory 104 stores the parallel data 103. At the same time, tag word 106 of n bits generated from frame controller 105 is written into a tag memory 107. Data memory 104 and tag memory 107 may be formed integrally by a (m+n)-bit memory.

Serial-to-parallel converter 102 is comprised of a m-bit shift register. What number of bits (k bits, m≧k) of the m-bit output are to be used is determined by the time when a write pulse 108 is applied from frame controller 105 to data memory 104 and tag memory 107. That is, if the write pulse is applied to the memory at the instant of entry of the k-th bit of serial input data 101 into shift register 102, then k-bit data is written into data memory 104 as parallel data 103.

Frame controller 105 responds to input clocks 109 synchronized with input data 101 and output clocks 110 synchronized with output data 121 to produce write pulse 108 and processing clocks 118 to be described later.

Frame controller 105 includes a counter for counting the clocks and a memory accessed by the count value of the counter, to output the tag word.

Tag word 106 carries information concerning processes to be executed by processing units 111 and 115. In this embodiment, it is assumed that the tag word is comprised of n=2 bits, a first bit serving as an insertion control signal and a second bit as a scramble control signal for instructing scramble-off scramble-reset, etc.

The parallel data and tag word stored in data memory 104 and tag memory 107 are transferred in pairs to inserter 112 nd memory/decoder 113 of first processing unit 111 in the framing unit. Inserter 111 is externally supplied with a block synchronization bit, a parity bit, a service bit, a staff control bit, a staff bit and so on as control bits 114 to be added to parallel data 103 and inserts control bits 114 in (m−k) bits of parallel data 103 in accordance with the decode result for the first bit of the tag word from memory/decoder circuit 113.

It is assumed that the time when write pulse 108 is generated is set by frame controller 105 such that k=m when the control bits are not inserted into parallel data 103, and k=m−1 when the control bits are inserted. When k=m−1, frame controller 105 sets the insertion control signal assigned to the first bit of the tag word to a value to instruct the bit insertion. When the first bit of the tag word instructs the bit insertion, inserter 12 inserts control bits 114 into (m−k) bits of parallel data 103. In this case, control bits 114 are periodically generated in accordance with a predetermined rule in order for a specific type of control bit to be inserted into a specific position.

Parallel data issued from first processing unit 111 is transferred to scrambler 116 in second processing unit 115, and, at the same time, outputs of memory/decoder 113 of first processing unit 111 are transferred to memory/decoder 117 of second processing unit 115.

To improve the randomization of data, scrambler 116 performs an exclusive OR operation of the input parallel data and quasi-random sequential data of M sequences (maximum periodic sequences) output in parallel from a quasi-random generator. In this case, where the scramble-off is instructed by the scramble control signal allocated to the second bit of the tag word transferred to memory/decoder circuit 117, scrambler 116 operates not to scramble the control bits inserted by inserter 112. The scramble control signal may be used to instruct the presence or absence of the scramble reset. When the scramble reset is instructed, the output of the quasi-random generator is reset to 0 in scrambler 116.

After being subjected to the framing process by first and second processing unit 111 and 115, parallel data (parallelly framed data) 119 is returned to serial data by parallel-to-serial converter 120 and then transferred to a multiplexing unit or a transmission system as output data 121 of the framing unit.

First and second processing units 111 and 115 perform transfers of the parallel data and tag word and internal processes in synchronism with processing clocks 118 from frame controller 105. In this case, the transfers of the parallel data and tag word could reliably be performed by displacing the phase of processing clocks by 180 degrees or 90 degrees. To this end, as processing clocks 118, two-phase clocks $\phi1$ and $\phi2$ differing in phase by 180 degrees as shown and four-phase clocks sequentially displaced in phase by 90 degrees may be used. Processing clocks 118 are generally generated in correlation with output clocks 110. In other words, processing clocks 118 are generated in the same cycle as output clocks 110.

In the above embodiment, the processing units may include processing units for performing the alteration of data and the like which have no direct correlation with the framing. To such processing units a tag word with information associated with the processes to be performed as well as parallel data may be transferred.

The tag word need not be in one-to-one correspondence with the above processes. By way of example, the tag word may be assigned a binary code representing the number of times of conversion from the front of a frame in serial-to-parallel converter 102, in other words, a word number (block number) of parallel data 103 obtained by serial-to-parallel converter 102. The binary code is initialized at the front of the frame. In this case, each processing unit can determine what process to perform in a block known from the block number on the basis of the decode result by the decoder circuit, and executes subsequent processing based on the determined result.

According to the above embodiment, frame controller 105 issues tag word data directing the framing process which is transferred to memory/decoder circuits 113 and 117 via tag memory 107. By this transfer of the tag word data, inserter 112 and scrambler 116 perform their own unique processes according to the contents of the tag word decoded by memory/decoder circuits 113 and 117, or the insertion of the control bits and the scrambling process. In other words, when being read from data memory 104, input data 101 is formatted in a form suitable for the framing process by frame controller 105 and then transferred to processing units 111 and 115 together with the tag word data. Processing units 111 and 115 process the input data in accordance with the tag word. Therefore, processing units 111 and 115 can uniquely process the input data without being controlled by the input data.

According to the above embodiment, serial input data is converted to parallel data and stored in the data memory, and then the parallel data read from the image memory is sequentially subjected to different types of process necessary for the framing. Thus, the processing speed can be lowered by a factor corresponding to the number of bits of the parallel data, and the framing can be realized by using low-speed components in various portions except for the serial-to-parallel and parallel-to-serial converters. A problem of a time difference between the parallel data and the tag word will not virtually arise because the tag word carrying information directly or indirectly concerning the processes to be performed by each processing unit is stored in the tag memory and then sequentially transferred to the processing units simultaneously with the parallel data stored in the data memory. Accordingly, in the case of IC version of the apparatus, the inside layout of an IC can be made free from such limitations for timing adjustment of control operations and data signals as in the prior art, enabling a layout with high degree of freedom to be designed.

Further, even in the case of adding to the apparatus of the present invention process procedures, other than the process procedures for framing, which prefer incorporation into the framing units, they can easily be added by simply adding processing units additionally provided with tag word memory and decoder circuits. If each of the processing units were packaged, the IC design would become easier.

The above embodiment is described with respect to the framing process at the transmitting end. Next, a frame synchronizing circuit used at the receiving end will be described.

Figure 12:
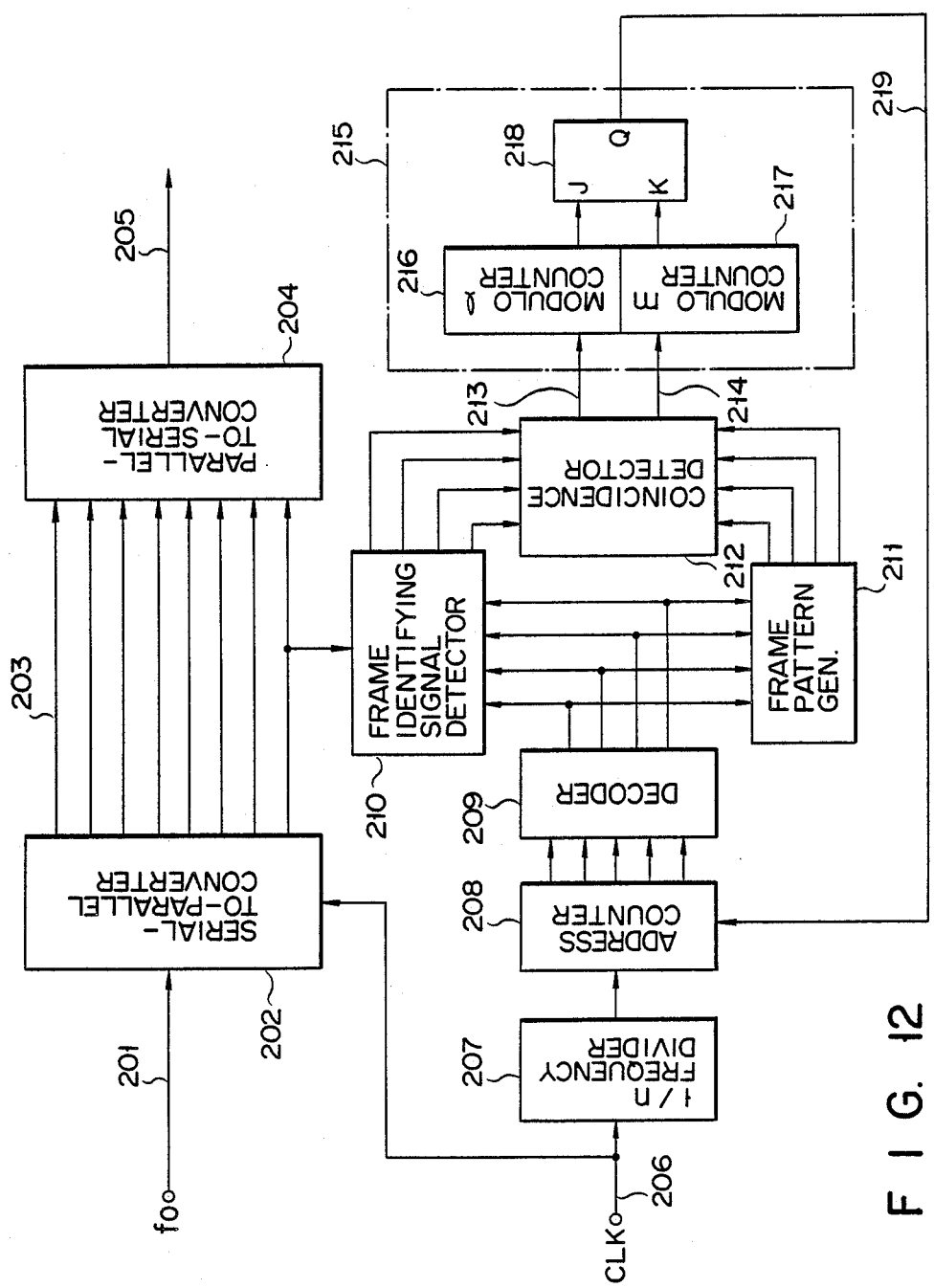
FIG. 12 is a block diagram of a frame synchronization circuit used at a receiving end in the digital multiplexer of the present invention.

According to the frame synchronizing circuit of FIG. 12, one block of a transmission signal is formed of a code of n=8 bits. By way of example, a case where a frame identifying signal is added to the front of a first block of four successive blocks as shown in FIG. 13 will be described.

Figure 13:
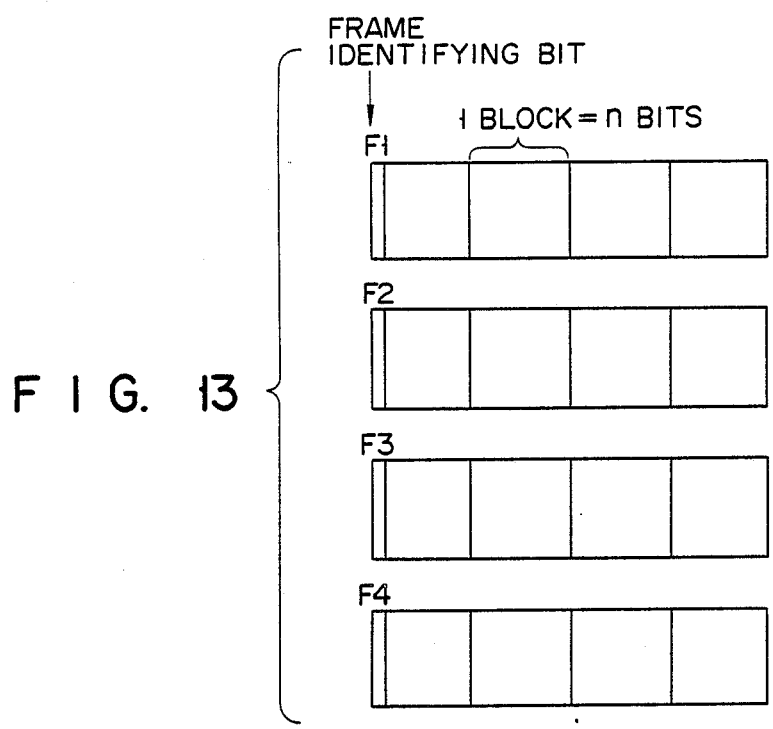
FIG. 13 shows a format of frame data.

In the frame synchronizing circuit of FIG. 12, input data 201 is serial data which has a bit rate of and a frame structure in which one block is comprised of 8 bits and frame identifying signals F1, F2, F3, F4 are each added to the front of a first block of four successive blocks as shown in FIG. 13. The serial data is converted to 8bit parallel data 203 by serial-to-parallel converter 202. In this case, the frame synchronizing signal is issued onto the lowest one of 8 output lines of serial-to-parallel converter 202. Output data 203 of serial-to-parallel converter 202 is returned to serial data 205 by parallel-to-serial converter 204 and then sent to a succeeding circuit.

Figure 14:
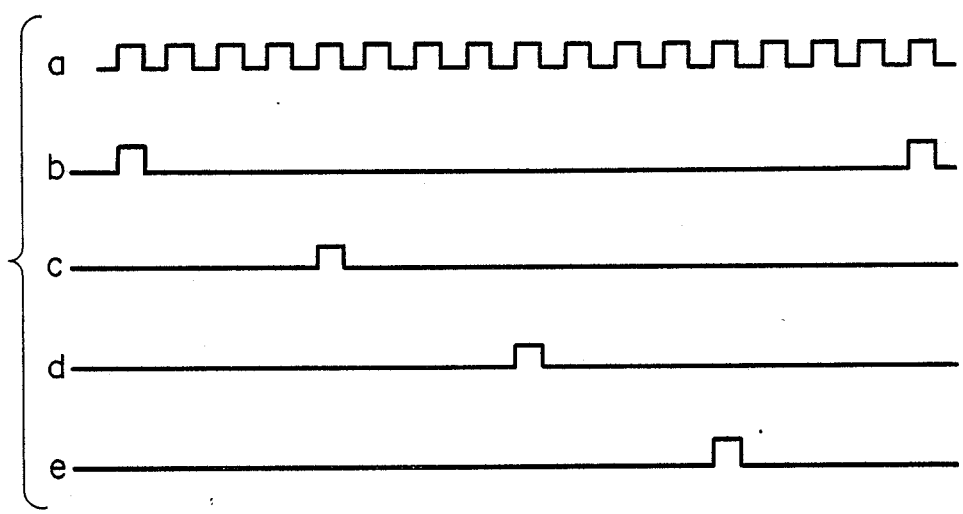
FIG. 14 is a timing diagram of signals produced by the circuit of FIG. 12.

On the other hand, a clock signal 206 with a frequency fo is divided in a frequency divider 207 by a factor of n=8 to provide a clock signal a (FIG. 14) of the same rate as output data 203 of serial-to-parallel converter 202. The clock signal a is applied to address counter 208 serving as a first counting means. Output signals of address counter 208 are applied to decoder circuit 209 to provide 4-phase sequential pulses (frame position pulses) shown at b, c, d, e in FIG. 14 and having the same period as the frame identifying signal. That is, a frame position pulse is produced once every four blocks.

The frame position pulses are entered into frame identifying signal detector 210 and frame pattern generator 211. Frame identifying signal detector 210 detects a frame identifying signal on the specific bit of parallel data 203 from serial-to-parallel converter 202 by using the frame position pulses. Frame pattern generator 211 ANDs the frame position pulses with a frame identifying bit previously set to provide a frame pattern.

Coincidence detector 212 detects the coincidence or inconsistency between the frame identifying signal from frame identifying circuit 210 and the frame pattern from frame pattern generator 211 to produce a coincidence detect pulse 213 when the coincidence occurs or an inconsistency detect pulse 214 when no coincidence occurs.

Frame protection counter 215 serving as second counting means comprises modulo l counter 216, modulo m counter 217 and JK flip-flop 218. Counters 216 and 217 are adapted to detect coincidence detect pulse 213 and inconsistency detect pulse 214, respectively. Here l and m are each an integer and may be chosen to be m=l=8. Counter 216 for counting coincidence detect pulse 213 is reset by inconsistency detect pulse 214, and counter 217 for counting inconsistency pulse 214 is reset by coincidence detect pulse 213.

Outputs of counters 216 and 217 are coupled to J and K inputs, respectively, of flip-flop 218 which provides a count enable signal 219 to address counter 208. Where inconsistency detect pulse 214 is successively produced over eight frames, flip-flop 218 is inverted in state to temporally disable address counter 208 so that a synchronization restorative operation is performed. With such an arrangement, the frame synchronization is established only when coincidence detect pulse 213 is successively produced for eight frame periods. The synchronization will not be lost unless inconsistency detect pulse 214 is successively produced over eight frames. The frame synchronization pulse may be produced on the basis of coincidence detect pulse 213 from coincidence detector 212.

According to the above frame synchronization circuit, serial input data, having a frame structure in which a frame identifying signal is located at a predetermined position of blocks, is converted to parallel data in such a way that the frame identifying signal always appears in a specific bit, and then the detection of the frame identifying signal is performed for the specific bit. Thus, the circuit scale can be reduced significantly. Further advantageously, the frame synchronization circuit can be realized by using general-purpose ICs instead of using high-speed logic components because the transmission signal is lowered in speed by the serial-to-parallel conversion to establish the frame synchronization.

What is claimed is:

1. A framing unit used for a digital multiplexer comprising:
   serial-to-parallel converting means having m parallel output lines, for converting serial input data to parallel data of m bits or (m+n) bits of less than m bits by at least one bit, and issuing the parallel data onto m output lines or (m−n) output lines of less than m output lines by at least one line;
   switching means for selectively switching the parallel data issued by said serial-to-parallel converting means between m bits and (m−n) bits;
   framing means connecting to said output lines, for inserting at least one control bit necessary for framing into said at least one output line when the (m−n)-bit parallel data are issued from said serial-to-parallel converting means; and
   parallel-to-serial converting means for converting output data of said framing means to serial data.

2. A framing unit according to claim 1, wherein said framing means comprises means for selectively inserting a frame synchronization bit, a channel identifying bit, a parity bit, a service bit and at least one of a staff bit and a staff control bit representing a kind of data to be inserted.

3. A framing unit according to claim 1, wherein said framing means includes means for scrambling the parallel data.

4. A framing unit according to claim 1, wherein said serial-to-parallel converting means has a shift register function to shift the serial input data in response to predetermined clocks and a latch function; and wherein said switching means includes counter means for counting the clocks and having a dividing factor switchable between 1/m and 1/(m+1), said counter means applying a latch pulse to said serial-to-parallel converter means to selectively switch the parallel data issued therefrom between m bits and (m−n) bits.

5. A digital multiplexer comprising:
N framing units for dividing N-channel digital information signals into N signal blocks in accordance with a format suitable for framing, said N signal blocks each having a plurality of block signals; and
multiplexing means for generating a block synchronization signal and time-division multiplexing the block signals simultaneously issued from said framing units at least one at a time in response to the block synchronization signal to provide a time-division multiplexed signal;
each of said framing units including timing signal producing means responsive to the block synchronization signal for producing a timing signal at a time according to a predetermined initial value which differs from the other framing units; and means for producing the block signal in synchronism with the timing signal.

6. A digital multiplexer connected to external signal line means transmitting external clocks, according to claim 5, wherein:
said timing signal producing means includes initial value setting means for outputting the initial value; and
counter means connected to said initial value setting means and said external signal line means, for counting the external clocks to produce the timing signal when counting the clocks whose number corresponds to the initial value set by said initial value setting means in response to the block synchronization signal.

7. A digital multiplexer according to claim 5, wherein each of said framing units includes serial-to-parallel converting means for converting the digital information signal to parallel data; framing means for selectively adding specific bit information to the parallel data from said serial-to-parallel converting means to provide a parallel frame signal including the block signal; and parallel-to-serial converting means for converting the parallel frame signal from said framing means to serial data and providing a block signal in response to the timing signal.

8. A framing unit used for a digital multiplexer comprising:
serial-to-parallel converting means for converting serial input data to parallel data;
a data memory for storing the parallel data from serial-to-parallel converting means;
framing means having a plurality of processing units for sequentially applying a plurality of processes necessary for framing to the parallel data read from said data memory;
a tag memory for storing a tag word having a plurality of bits with information relating to a process to be applied to the parallel data in each of said processing units; and
means for sequentially transferring the tag word to said processing units in said framing unit.

9. A framing unit according to claim 8, wherein said framing means includes a processing unit for adding control bits necessary for framing to the parallel data; and wherein the tag word carries information for instructing the presence or absence of the insertion of the control bits for every parallel data.

10. A framing unit according to claim 8, wherein said framing unit includes a processing unit for scrambling the parallel data; and wherein the tag word carries information for instructing on or off of scrambling for every parallel data.

11. A framing unit according to claim 8, wherein bits of the tag word correspond to the processes to be performed by said processing units, respectively.

12. A framing unit according to claim 8, wherein each of said processing units in said framing means includes means for decoding the tag word.

13. A framing unit used for a digital multiplexer comprising:
clock generating means for generating first and second clocks;
serial-to-parallel converting means for converting serial input data to parallel data in response to the first clocks;
first counter means connected to said clock generating means, for counting the first clocks, to output a first count signal;
second counter means connected to said clock generating means, for counting the second clocks, to output a second count signal;
phase comparing means connected to said clock generating means and said first counter means, for comparing the first count signal of said first counter means with a signal synchronized with the second clocks;
framing means connected to said serial-to-parallel converting means and said second counter means, for framing the parallel data from said serial-to-parallel converting means in synchronism with the second count signal of said second counter means and performing a staff process in accordance with an output of said phase comparing means; and
parallel-to-serial converting means connected to said framing means and said clock generating means, for converting output data of said framing means in response to the second clock signal.

14. A framing unit according to claim 13, wherein said framing means include means for selectively inserting, in specific bits of the parallel data from said serial-to-parallel converting means, at least one of a frame synchronization bit, a channel identifying bit, a parity check bit and a service bit, and a staff bit and a staff control bit representing a kind of data to be inserted.

15. A framing unit according to claim 14, wherein said framing means includes means for storing a comparison result by said comparing means at a predetermined time in a frame; and means for determining a value of the staff control bit in accordance with the stored comparison result and inserting the staff bit in the parallel data in accordance with the determination of the value of the staff control bit.

16. A framing unit according to claim 15, wherein the timing of storage of the comparison result by said phase comparing means is set to correspond to a period of each of blocks forming a frame.

17. A framing unit according to claim 15, wherein said framing means includes means for cancelling the storage of the comparison result within a time interval between the insertion of the staff bit performed according to the comparison result and the end of a frame in which the staff bit is inserted.

18. A frame synchronization circuit used for digital multiplexer comprising:
a serial-to-parallel converter circuit for converting serial input data, having a frame structure in which a frame identifying signal is inserted at a predetermined position of blocks, to n-bit parallel data in such a way that the frame identifying bit is positioned at a specific location;

detecting means connected to said serial-to-parallel converter means, for detecting the frame identifying signal from the parallel data of said serial-to-parallel converter circuit;

first counting means for counting a clock signal with the same rate as a coding rate of the parallel data of said serial-to-parallel converter circuit;

means responsive to said first counting means for producing frame position pulses having the same period as that of the frame identifying signal;

means responsive to the frame position pulses from said pulse producing means for producing a frame pattern of the same pattern as that of the frame identifying signal;

coincidence detecting means connected to said pattern producing means and said detecting means, for detecting coincidence/inconsistency between the frame pattern produced by said pattern producing means and the frame identifying signal to produce at least an inconsistency pulse; and second counting means connected to said coincidence detecting means, for counting consecutive inconsistency pulses produced by said coincidence detecting means to temporally stopping the counting operation of said first counting means when a predetermined number of the consecutive inconsistency pulses are counted.

* * * * *